(12) United States Patent
Patey et al.

(10) Patent No.: US 9,860,069 B2
(45) Date of Patent: Jan. 2, 2018

(54) GROUP SIGNATURE USING A PSEUDONYM

(71) Applicant: MORPHO, Issy-les-Moulineaux (FR)

(72) Inventors: Alain Patey, Issy les Moulineaux (FR);
Herve Chabanne, Issy les Moulineaux (FR); Julien Bringer, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 102 days.

(21) Appl. No.: 14/761,161

(22) PCT Filed: Mar. 25, 2014

(86) PCT No.: PCT/EP2014/055969
§ 371 (c)(1),
(2) Date: Jul. 15, 2015

(87) PCT Pub. No.: WO2014/154694
PCT Pub. Date: Oct. 2, 2014

(65) Prior Publication Data
US 2016/0013946 A1    Jan. 14, 2016

(30) Foreign Application Priority Data

Mar. 25, 2013  (FR) ..................................... 13 52650

(51) Int. Cl.
*H04L 9/32* (2006.01)
*H04L 29/06* (2006.01)

(52) U.S. Cl.
CPC .......... *H04L 9/3255* (2013.01); *H04L 9/3218* (2013.01); *H04L 9/3268* (2013.01); *H04L 63/08* (2013.01); *H04L 2209/42* (2013.01)

(58) Field of Classification Search
CPC ... H04L 9/3255; H04L 9/3268; H04L 9/3218; H04L 2209/42
See application file for complete search history.

(56) References Cited

U.S. PATENT DOCUMENTS

| 2005/0081038 | A1* | 4/2005 | Arditti Modiano ... H04L 9/3255 |
| | | | 713/176 |
| 2011/0060903 | A1* | 3/2011 | Yoshida .................. H04L 9/302 |
| | | | 713/155 |
| 2012/0159166 | A1* | 6/2012 | Lee ........................ H04L 9/0891 |
| | | | 713/168 |

FOREIGN PATENT DOCUMENTS

EP    2153925    2/2010

OTHER PUBLICATIONS

French Search Report and Written Opinion, dated Feb. 14, 2014, French Application No. 1352650.

(Continued)

*Primary Examiner* — Ellen Tran
(74) *Attorney, Agent, or Firm* — Blakely Sokoloff Taylor & Zafman LLP (57) ABSTRACT

The invention relates to a method for signing a message (m), implemented by processing means of a user device of a member ($M_i$) belonging to a group of members (G), said user device having a secret signature key (ski), said method including a step of generating (E301) a group signature (σ) for the message (m), enabling said member ($M_i$) to prove his membership in the group (G), and a step of generating (E302) a pseudonym ($nym_{ij}$) identifying the member ($M_i$) within a domain ($D_j$) of a service provider ($SP_j$), said domain including a set of terminals in communication with a server of said service provider, said signature (σ) being designed such that said member ($M_i$) can prove, by signing the message (m), his knowledge of said secret signature key without disclosing it, said group signature (σ) being designed such that the membership of the member ($M_i$) in the group is verifiable independently from the pseudonym ($nym_{ij}$), said pseudonym and said signature being a function of a (Continued)

portion (xi) of said secret signature key of the member ($M_i$) and being designed so as to prove that the member identified by the pseudonym is the signatory of the message (m) and said pseudonym ($nym_{ij}$) of said member ($M_i$) being specific to the domain ($D_j$).

19 Claims, 5 Drawing Sheets

(56) References Cited

OTHER PUBLICATIONS

Bender, Jens, et al., "Domain-Specific Pseudonymous Signatures for the German Identity Card", *Information Security*, (Sep. 19, 2012), 104-119.

Bringer, Julien, et al., "Backward Unlinkability for a VLR Group Signature Scheme with Efficient Revocation Check", *International Association for Cryptologic Research*, vol. 20120514:133910, (May 14, 2012), 1-22.

International Search Report and Written Opinion with English Language Translation, dated Jun. 27, 2014, Application No. PCT/EP2014/055969.

Bringer, Julien, et al., "Collusion-Resistant Domain-Specific Pseudonymous Signatures", *International Association for Cryptologic Research*, vol. 20130401:132437, (Mar. 31, 2013), 1-15.

\* cited by examiner

GROUP SIGNATURE USING A PSEUDONYM

FIELD OF THE INVENTION

The present invention generally relates to the field of digital signatures.

The invention relates more specifically to a novel signature method combining a group signature with the use of pseudonyms, for authentication purposes.

It applies quite particularly to identity documents, especially to Machine Readable Travel Documents (MRTD) such as passports or identity cards.

STATE OF THE PRIOR ART

Figure 1:
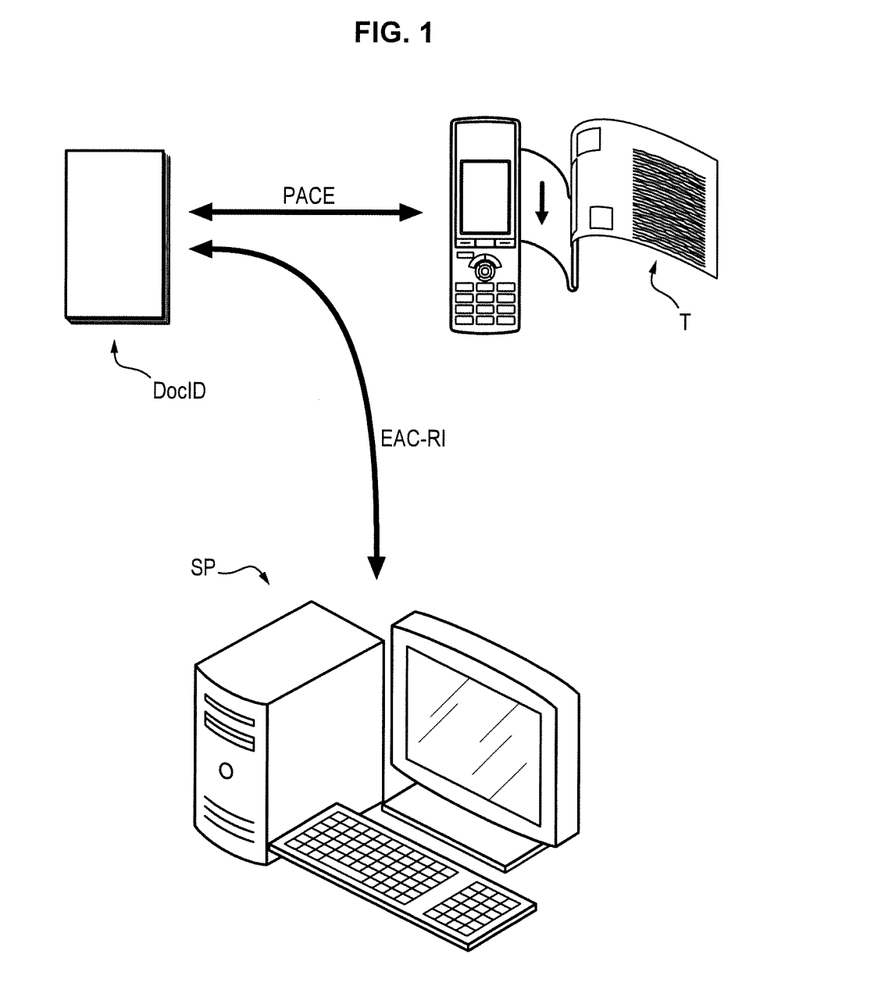
FIG. 1 illustrates advanced security mechanisms for MRTD.

As illustrated in FIG. 1, in order that a holder of an identity document DocId of MRTD type can access a service proposed by a service provider SP, a connection is established between the identity document and a terminal T of the service provider and various security mechanisms are put in place. Among these mechanisms, the PACE (Password Authenticated Connection Establishment) protocol makes it possible to establish a secure channel between the identity document and the terminal, and the EAC (Extended Access Control) protocol makes it possible to perform a mutual authentication of the identity document and the service provider and to establish another secure channel.

Furthermore, the RI (Restricted Identification) protocol makes it possible to generate a pseudonym specific to an identity document for a given domain grouping together a set of terminals of the service provider. This pseudonym enables said terminals to identify the identity document. Moreover, this protocol satisfies the property of "cross-domain anonymity": it is impossible to establish a link between the pseudonyms used for different domains for a same identity document.

This protocol may be extended to the use of such pseudonyms to digitally sign a message. Such a variant of this protocol is described in the reference Bender, J., Dagdelen, O., Fischlin, M., Kugler, D.: *Domain-specific pseudonymous signatures for the German identity card.* In: Gollmann, D., Freiling, F. C. (eds.) *ISC. Lecture Notes in Computer Science, vol.* 7483, pp. 104-119, Springer (2012) and proposes that each user holds a secret element, known as signature key, generated by a key management authority from his own secret key, and that this secret element is used both to sign the messages emitted and to generate the pseudonym used by this user. This protocol makes it possible to guarantee that the user has a valid and non-revoked signature key, and that the pseudonym used is legitimate.

Such a protocol verifies the following three properties: "unforgeability", "cross-domain anonymity" and "seclusiveness".

The property of "unforgeability" assures that it is impossible for anyone to forge a signature on behalf of a holder of an identity document.

The property of "seclusiveness" assures that it is impossible that a valid signature is generated using a non-valid pseudonym.

Nevertheless, this protocol is based on the hypothesis that users cannot recover their signature key, said key being assumed to be stored on a tamperproof microchip of an identity document. In fact, the gathering by at least two users of their signature keys would enable them to recover the secret key from the key management authority and thus to generate new valid keys. There thus exists a need to propose a signature mechanism that is secure even in the case of recovery and gathering of the signature keys of several users.

On the other hand, this protocol also assumes that the key management authority does not memorise the signature keys generated for the users, once these have been delivered. In fact, knowledge of the keys by the key management authority would enable it to use them to sign a message on behalf of any legitimate user. Yet, the absence of memorisation of these keys by the key management authority is difficult to guarantee. There thus also exists a need to propose a signature mechanism guaranteeing that no authority can sign a message on behalf of a user.

Moreover, another known signature mechanism is the group signature, as described in the reference Bringer, J. Patey, A.: *VLR group signatures—how to achieve both backward unlinkability and efficient revocation checks.* In: *SECRYPT.* pp. 215-220 (2012). This enables a member of a group to sign a message anonymously in the name of the group and to prove the membership of said member in said group.

It provides for associating a group secret with members of a group. It also provides for associating with each member of the group a secret key composed of a first portion of key generated by the member and a second portion of key based both on the first portion of key and on the group secret. The signature of a message or challenge by a member with his secret key enables said member to prove that he is a member of the group while remaining anonymous.

Nevertheless, such a mechanism does not enable a member of the group to have an identity within this group.

The following references also describe group signature mechanisms: David Chaum, Eugène van Heyst: Group Signatures. EUROCRYPT 1991:257-265 and Dan Boneh, Hovav Shacham: Group signatures with verifier-local revocation. ACM Conference on Computer and Communications Security 2004:168-177.

There thus exists a need to propose a signature mechanism enabling a member of a group to sign a message in the name of the group, while having an identity within the group, without having the drawbacks of the signature mechanisms using pseudonyms cited above.

SUMMARY OF THE INVENTION

To this end, the invention relates to a method for signing a message m implemented by processing means of a user device of a member $M_i$ belonging to a group of members G, said user device having a secret signature key ski, including a step of generating a group signature σ for the message m enabling said member $M_i$ to prove his membership in the group of members G and a step of generating a pseudonym $nym_{ij}$ identifying the member $M_i$ within a domain $D_j$ of a service provider $SP_j$, said domain $D_j$ including a set of terminals in communication with a server of said service provider, said group signature a being designed such that said member Mi can prove by signing the message m his knowledge of said secret signature key without disclosing it, and characterised in that said group signature is designed such that the membership of the member in the group is verifiable independently of the pseudonym, and in that said pseudonym and said signature are a function of a portion xi of said secret signature key of the member $M_i$, and are designed so as to prove that the member identified by the pseudonym is the signatory of the message m and in that said pseudonym $nym_{ij}$ of the member $M_i$ is specific to the domain $D_j$.

The signature mechanism which is the subject matter of the invention thus combines a group signature and the use of pseudonyms, and enables the signatory to prove his membership in the group while having an identity within said group.

In a variant, the secret signature key (ski) is known uniquely to the member $M_i$ having said user device. Thus, no-one, not even the key management authority, can therefore sign a message on behalf of the member $M_i$.

Advantageously, said secret signature key (ski) is stored in a secure storage means to prevent access thereto by a third party.

In an embodiment, prior to said steps of generating a group signature and a pseudonym, said method may include a step of generating keys implemented by a key management server of a key management authority, during which, processing means of the management server generate for the group of members G a set of public parameters gpk, determine a domain parameter $dpk_j$ specific to the domain $D_j$, and transmit said parameter to the service provider $SP_j$.

Advantageously, the domain parameter ($dpk_j$) is equal to $g_1^{r_j}$, with $r_j$ an integer and g1 a generator of a group G1, g1 being a parameter among the set of public parameters (gpk). In an embodiment, the integer $r_j$ is determined by the key management authority.

In a preferential manner, said pseudonym $nym_{ij}$ of the member $M_i$ in the domain $D_j$ is a function of the domain parameter $dpk_j$ specific to the domain $D_j$ determined by said management server.

In particular, the pseudonym $nym_{ij}$ may be equal to $dpk_j^{xi}$ with xi said portion of secret signature key of the member $M_i$ and $dpk_j$ said domain parameter.

Thus, the pseudonym of a member is different in each domain and does not reveal the portion of secret key used to generate it, which makes it possible to guarantee that pseudonyms of the same member in two different domains could not be linked.

On the other hand, said signature σ may include a value K, different to the pseudonym, of the form B^xi with B an element of a group G1 and xi said portion of secret signature key of the member $M_i$.

According to a variant, processing means of the user device implement a zero knowledge proof algorithm in which said signature is generated so as to prove that the member identified by the pseudonym ($nym_{ij}$) is the signatory of the message. The use of a zero knowledge proof algorithm enables the signatory to provide proof of his identity without however disclosing his secret key.

The invention also relates to a method for controlling a signature of a message m and a pseudonym implemented by processing means of a control server, said signature σ and said pseudonym nymij being generated according to the method for signing described previously, including a step of verification, from the signature σ and the pseudonym nymij, of the knowledge by the member Mi of the secret signature key ski and that said pseudonym and said signature of the member Mi are a function of a portion xi of said secret signature key, so as to prove that the member identified by the pseudonym is the signatory of the message m and that he belongs to the group of members G.

According to a variant, said step of verification comprises a step of verification of proof during which processing means of the control server verify that a zero knowledge proof proving that the member identified by the pseudonym is the signatory of the message (m) is correct. Said step of verification of proof can verify the equality of discrete logarithms of the value K in base B and of the pseudonym $nym_{ij}$ in base $dpk_j$. Such a step thus proves that the member identified by the pseudonym is indeed the signatory of the message m without having to calculate said discrete logarithms and without revealing any portion of the secret signature key of the member $M_i$.

According to an embodiment, said step of verification includes a verification of said signature to prove the membership of the member (Mi) in the group and said step of verification of proof is carried out during the verification of said signature. Thus the verification of the signature makes it possible both to prove the membership of the signatory in the group and to prove that the member identified by the pseudonym is indeed the signatory of the message.

The control method may also include a step of verification of the revocation of the member Mi from the group of members G.

To do so, processing means of the control server can verify in a database that the pseudonym $nym_{ij}$ of the member Mi does not belong to a revocation list $RL_j$ for the domain $D_j$, said revocation list being designed from pseudonyms $nym_{ij}$ of the members of the group G revoked by the management authority.

The management authority wishing to revoke a member Mi from the group of members G, transmits said portion of secret key $x_i$ of the member $M_i$ to the service provider $SP_j$. The revocation list $RL_j$ for the domain $D_j$ stored in a database is constructed by the service provider $SP_j$ by adding, to the revocation list $RL_j$, the pseudonym $nym_{ij}$ of the member Mi calculated from said portion of secret key received.

The invention also relates to a computer program including program code instructions for the execution of the steps of the methods for signing and signature controlling defined above when said program is executed on a computer, a user device and a control server including at least storage means, processing means and communication interface configured to implement respectively a method for signing and amethod for signature controlling as defined above as well as a system including at least one such user device and at least one such control server.

DESCRIPTION OF THE FIGURES

Other characteristics and advantages will become clearer from the description that follows, which is purely illustrative and non-limiting and which should be read with regard to the appended figures, among which.

DETAILED DESCRIPTION OF AT LEAST ONE EMBODIMENT

Figure 2:
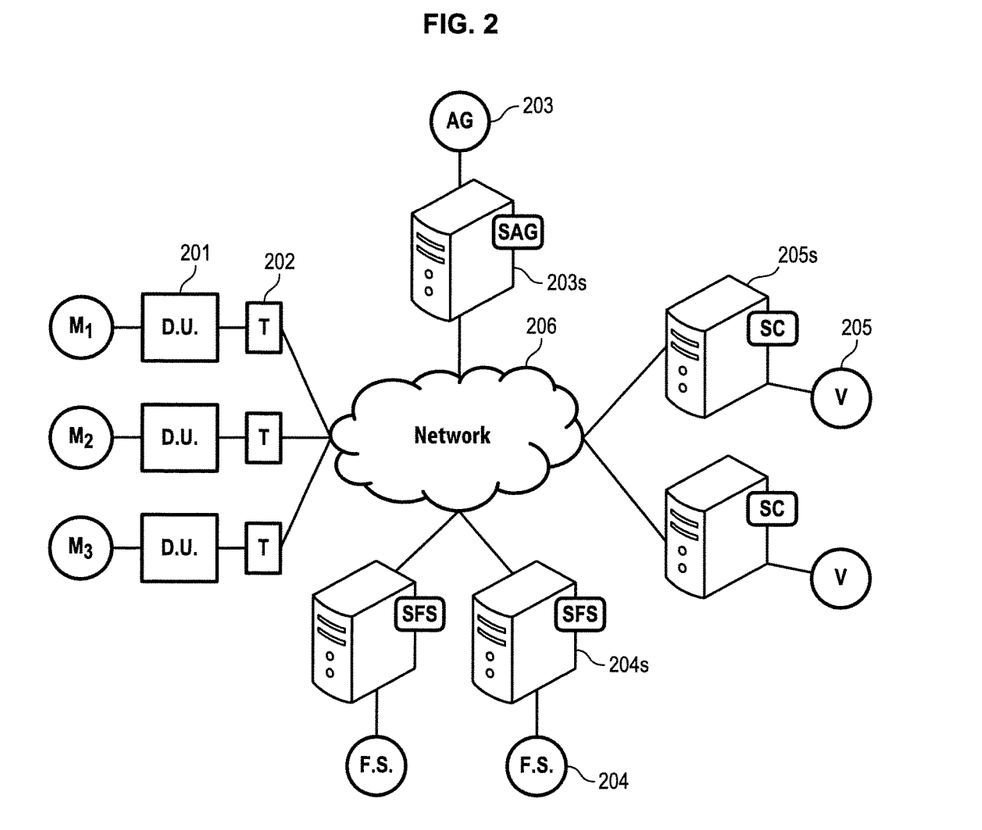
FIG. 2 is a schematic representation of an example of system for the implementation of the methods according to the invention.

FIG. 2 represents an example of system for the implementation of the methods according to the invention.

Such a system comprises a set of user devices 201 each held by a member Mi, (i integer) forming part of a set of members constituting a group of members G, reading terminals 202, a key management authority 203, service providers 204 and verifiers 205, the verifiers being able to be service providers.

The set of user devices, reading terminals, key management authority, service providers and verifiers are interconnected through a computer network 206. A set of terminals of this network in communication with a service provider constitutes a domain.

The key management authority, the service providers and the verifiers may be connected to said network by respective servers including a random access memory and storage means such as a rewritable non-volatile memory (flash memory or EEPROM memory) being able to store a database, processing means comprising a processor, cryptographic units to generate in particular random numbers, etc., and interface means enabling them to communicate with other entities on the network and to be connected to databases. Such servers may also comprise input means and user interface means enabling the administration thereof. The servers of the aforementioned entities are respectively designated key management server 203s, service provider server 204s, and control server 205s in the remainder of the description.

Advantageously, at least two of these servers may be combined within a same computer device jointly assuring the functions of said servers.

The user device of a member $M_i$ may include a portable electronic device capable of storing secure data which can be read by a reading terminal.

A portable electronic device may be an identity document including a chip in which are stored secure data, for example a Machine Readable Travel Document (MRTD) such as a passport or an identity card, a storage device with flash memory equipped with a USB communication interface, called USB (Universal Serial Bus) key, a smartcard, etc. The portable electronic device may comprise a random access memory and storage means such as a rewritable non-volatile memory (flash memory or EEPROM memory), processing means comprising a processor, cryptographic units to generate in particular random numbers, etc. The portable electronic device may also comprise a contactless communication interface such as a RFID or NFC interface, or instead a wireless communication interface such as a Bluetooth or Wi-Fi interface.

The secure data stored in the portable electronic device may be biometric data. In this case, the portable device may be provided with sensors making it possible to capture the biometric data of a member Mi, such as finger prints, palm prints or retinal prints.

A portable electronic device and a reading terminal can communicate through wireless or contactless communications such as those mentioned above. They can also communicate through a USB interface, Firewire or any other wired communication interface. They can also communicate through a contact interface of ISO 7816 type smartcard.

A reading terminal may also comprise a wired or wireless communication interface, adapted for the connection of the terminal to the computer network, such as an Ethernet, Wi-Fi or 3G interface; and a user interface enabling the member $M_i$ to control the operation thereof.

According to a variant, a portable electronic device and a reading terminal may be combined within a same electronic device including communication interface and user interface means similar to those described above.

The network linking the members $M_i$ and the servers consists by way of example of a local Ethernet network, a local wireless network, the Internet network, a mobile telephone network, etc. Advantageously, the communications on said network are secure, particularly by encryption of exchanged data.

Figure 3:
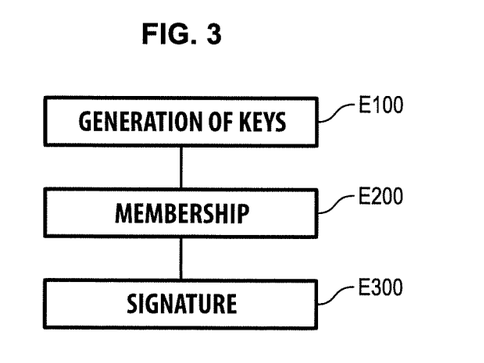
FIG. 3 represents a flow chart illustrating the generic steps of a method for signing according to an embodiment of the invention.

FIG. 3 represents a flow chart illustrating the generic steps of the method for signing in an embodiment of the invention.

The signature mechanism which is the subject matter of the invention combines a group signature and the use of pseudonyms.

In a preferential embodiment detailed below the group signature mechanism described is based on a VLR ("Verifier Local Revocation") group signature mechanism as described in the reference Bringer J., Patey A.: *VLR group signatures—how to achieve both backward unlinkability and efficient revocation checks*. In: SECRYPT. pp. 215-220 (2012).

The method for signing according to the invention may include a key generation step E100, an adherence to the group step E200 and a signing step E300, described in the following paragraphs.

The following notations are used:

$G_1$, $G_2$, $G_T$ bilinear groups of first order p (p being encoded on k bits) such that (p−1)/2 is a prime number, q a prime number, e a coupling of $G_1 \times G_2$ in $G_T$ that is to say a bilinear and non-degenerated form of $G_1 \times G_2$ in $G_T$, $g_1$ and $g_2$ of the generators of $G_1$ and $G_2$, Moreover, the notation '| |' represents the concatenation operation.

Figure 4:
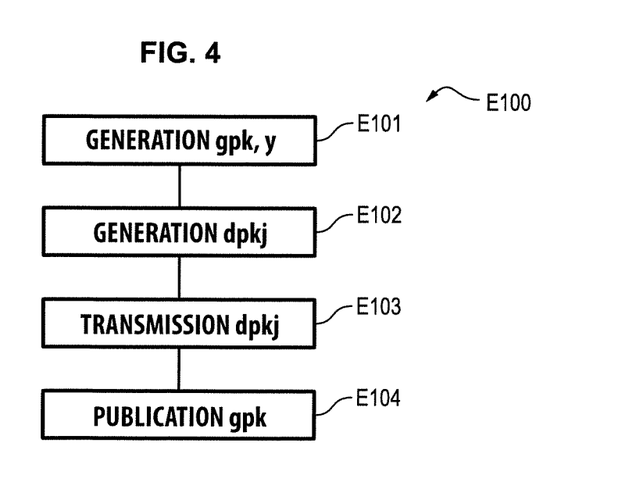
FIG. 4 represents a flow chart illustrating the steps of a method for generating public parameters according to an embodiment of the invention.

The method for signing may comprise a first key generation step E100 implemented by the key management server 203s, represented in FIG. 4. According to an embodiment, during a step E101 the processing means of the management server generate for the group a set of public parameters gpk and a group secret Y. During a step E102, the management server determines in a random manner a domain parameter $dpk_j$ and transmits it during a step E103 via its interface means to the server of the service provider $SP_j$ 204 belonging to a domain $D_j$. The public parameters gpk are made public during a step E104. According to a variant, the domain parameter $dpk_j$ is also made public.

More specifically, in an embodiment of the invention, during this step E100, the processing means of the key management server:

determine the bilinear groups of first order $G_1$, $G_2$, $G_T$, the prime number q and the coupling e.

determine a hash function H of $\{0, 1\}^*$ to $Z_p$ determine $\widetilde{g_1}$, $\widehat{g_1}$ belonging to $G_1$ determine the group secret Y belonging to $Z_p^*$ calculate $w = g_2^Y$ calculate $T_1 = e(g_1, g_2)$, $T_2 = e(\widetilde{g_1}, g_2)$, $T_3 = e(\widehat{g_1}, g_2)$ and $T_4 = e(\widehat{g_1}, w)$ From these elements, the key management server can generate the set of public parameters gpk=($G_1$, $G_2$, $G_T$, e, p, $g_1$, $g_2$, $\widetilde{g_1}$, $\widehat{g_1}$, w, H, $T_1$, $T_2$, $T_3$, $T_4$).

The group secret thus does not form part of the public parameters gpk, and is only held by the management authority. The difficulty of implementing the algorithm of the discrete logarithm for a well-chosen group $G_2$ makes it possible to guarantee the practical impossibility of recovering the group secret Y from w. Thus, the dissemination of w in the set of public parameters gpk does not pose any problem of security of the signature mechanism and w will be used to verify the membership in the group of the signatory of a message.

During step E102, for each service provider $SP_j$, the key management server generates a domain parameter $dpk_j$, specific to the domain $D_j$. This parameter may be a function of an integer number $r_j$. As an example, this parameter may be equal to $g_1^{r_j}$. The integer $r_j$ may advantageously be generated randomly by the management server by means of its cryptographic unit. The management server then transmits said parameter via its interface means to the server of the service provider $SP_j$.

The public parameters gpk and if need be the domain parameter $dpk_j$ may be made public in various ways. They may be sent to the user devices 201 and to the control servers 205s by the service providers or published on a site of the service providers.

Figure 5:
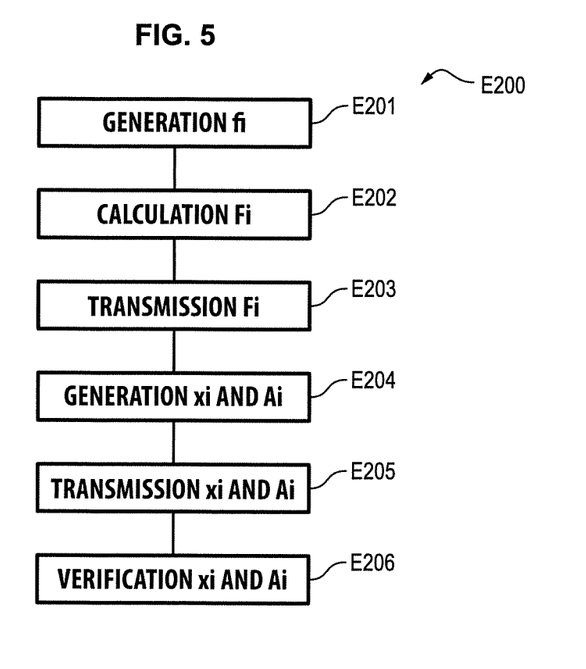
FIG. 5 represents a flow chart illustrating the steps of a method for adhering to a group according to an embodiment of the invention.

The method for signing may also comprise according to an embodiment of the invention a second step E200 called adherence to the group consisting in creating a secret signature key for a new member adhering to the group, described in FIG. 5. This step may be implemented when a holder of a user device 201 wishes to become a member $M_i$, i integer, of the group G managed by the key management authority 203 playing the role of group administrator.

According to an embodiment, said member can generate during a step E201 using the processing means of his portable electronic device a first portion of key unknown to the key management authority, transmit during a step E203 an identity data, calculated during a step E202 by these processing means from said first portion of key, to the key management server 203s and prove to the key management authority using said identity data that he holds the first portion of key by a zero knowledge proof algorithm. The key management server then generates during a step E204 and then transmits to the member $M_i$ during a step E205 the missing portion of key forming with the first portion of key the signature key of the member $M_i$.

More specifically, in an embodiment of the invention, during this step E200:

The key management server transmits to the user device of the member $M_i$ via its interface means a number $n_i$ determined randomly belonging to $\{0, 1\}^k$.

The processing means of the user device of the member $M_i$ determine a first portion of key $f_i$ belonging to $Z_p$ and calculate the identity data $F_i = \widetilde{g_1}^{f_i}$.

The processing means of the user device of the member $M_i$ determine randomly a number $r_f$ belonging to $Z_p$ and calculate $R = \widetilde{g_1}^{r_f}$ c=H(gpk| $F_i$| |R| |$n_i$) then $s_f = r_f + cf_i$.

The user device of the member $M_i$ transmits $F_i$, c and $s_f$ to the key management server.

The processing means of the key management server calculate $R' = \widetilde{g_1}^{s_f} \times F_i^{-c}$, compare c and H(gpk| $F_i$| |R'| |$n_i$) and verify that $s_f$ belongs to $Z_p$. If this comparison is positive, the member $M_i$ has correctly provided to the management authority the proof that he has the first portion of key $f_i$ without disclosing same.

If the comparison is positive, the processing means of the key management server determine a second portion of key $x_i$ belonging to $Z_p$ and calculate a third portion of key $A_i = (g_1 F_i)^{1/(xi+\gamma)}$.

The interface means of the key management server transmit the second and third portions of key, $x_i$ and $A_i$ to the member $M_i$ using a channel, preferably secure.

Optionally, $M_i$ verifies that $e(A_i, wg_2^{xi}) = e(g_1 \widetilde{g_1}^{f_i}, g_2)$ during a step E206.

Thus, Ai which constitutes the third portion of key is a function of the group secret and enables the member to prove that he forms part of the group.

Furthermore, in such an embodiment, the member $M_i$ is the only one to know the whole of his signature key constituted of the first, second and third portions of key. No-one, not even the key management authority, can therefore sign a message on behalf of the member.

The final optional verification enables the member to verify that the couple of second and third portions of key (Ai, xi) that has been transmitted to him has not been corrupted and is valid, that is to say verifies the equation $Ai = (g_1 Fi)^{1/(xi+\gamma)}$.

The signature key of the member $M_i$ may be stored in secure storage means of the user device belonging to the member $M_i$, advantageously in the non-volatile memory of the corresponding portable electronic device.

Similarly the second and the third portions of key may be stored by the key management server, advantageously within a database saved in the storage means of the key management server or instead connected thereto.

According to a variant of the invention, the first portion of key fi is calculated from a biometric data of the member $M_i$ captured by the sensors of the portable electronic device or instead memorised by it. The first portion of key $f_i$ may also be the result of the application by the processing means of the portable electronic device of a hash function to such biometric data.

Optionally, during the execution of this step of adherence to a group, the management authority sends the result of the coupling $e(A_i, g_2)$ to the member $M_i$ to avoid said member having to take care of the calculation of a coupling thereafter during the calculation of the signature.

Figure 6:
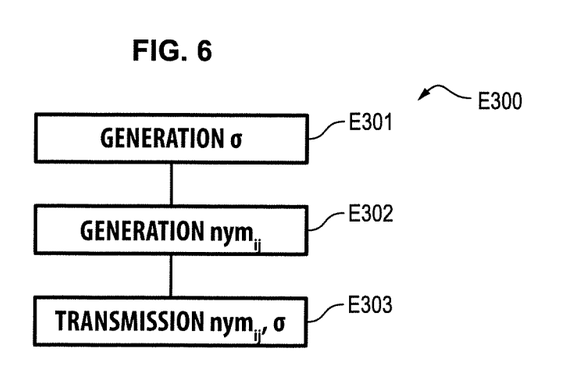
FIG. 6 represents a flow chart illustrating the steps of a method for signing a message according to an embodiment of the invention.

The signature method comprises a third step E300 of signing a message m, described in FIG. 6. The message m may be a challenge transmitted beforehand by a control server 205s to the member $M_i$ or instead any type of message to sign by the member $M_i$. Advantageously, the domain parameter dpkj is also transmitted to the member Mi, if this has not been made public or is not already known to said member.

This step makes it possible to generate during a step E301 for the message m a group signature making it possible to prove the membership of the member in the group anonymously and to associate therewith during a step E302 a pseudonym $nym_{ij}$ identifying the member Mi. Said pseudonym and said signature are a function of a portion of said secret signature key of the member Mi, and are designed so as to prove that the member identified by the pseudonym is the signatory of the message m. Furthermore, said pseudonym $nym_{ij}$ of the member $M_i$ is specific to the domain $D_j$.

Advantageously, the processing means of the user device implement a zero knowledge proof algorithm in which the signature is generated so as to prove that the member identified by the pseudonym $nym_{ij}$ is the signatory of the message m.

More specifically, in a first embodiment of the invention, during this step E300 the processing means of the user device 201 of the member $M_i$:

Determine B belonging to G1 and calculate $J=B^{f_i}$, $K=B^{x_i}$.

Determine a belonging to $Z_p$ and calculate $b=a\, x_i$ and $T=A_i\, \widehat{g_1}^{\,a}$ Determine $r_f, r_x, r_a, r_b, r_{x2}$, belonging to $Z_p$.

Calculate $R_1=B^{r_f}$, $R_2=B^{r_x}$, $R_4=K^{r_a}B^{-r_b}$, $R_3=e(T,g_2)^{-r_x}T_2^{r_f}T_3^{r_b}T_4^{r_a}$, $R_5=dpk_j^{r_{x2}}$, $R_6=B^{r_{x2}}$ Calculate $c=H(gpk|B|J|K|T|R_1|R_2|R_3|R_4|m)$ and $d=H(gpk|B|K|dpk_j|nym_{ij}|R_5|R_6)$ Calculate $s_f=r_f+c\, f_i$, $s_x=r_x+c\, x_i$, $s_a=r_a+c\, a$, $s_b=r_b+c\, b$, $s_{x2}=r_{x2}+d\, x_i$.

The member Mi then has the signature of the message: $\sigma=(B, J, K, T, c, s_f, s_x, s_a, s_b, d, s_{x2})$ and a pseudonym $nym_{ij}=dpk_j^{x_i}$. The elements $B, J, K, T, c, s_f, s_x, s_a$ and $s_b$ of the signature may be used to verify the membership of the member in the group independently of the pseudonym. The signature may thus be used anonymously. Moreover, the pseudonym and the elements $B, K, d$ and $s_{x2}$ of the signature may be used to prove that the same secret key has been used to generate the pseudonym and the signature, and thus prove that the member identified by the pseudonym $nym_{ij}$ is the signatory of the message m.

In a second embodiment, during this step E300, the processing means of the user device 201 of the member $M_i$:

Determine B belonging to $G_1$ and calculate $J=B^{f_i}$, $K=B^{x_i}$.

Determine a belonging to $Z_p$ and calculate $b=ax_i$ and $T=A_i\, \widehat{g_1}^{\,a}$ Determine $r_f, r_x, r_a, r_b$, belonging to $Z_p$.

Calculate $R_1=B^{r_f}$, $R_2=B^{r_x}$, $R_4=K^{r_a}B^{-r_b}$, $R_3=e(T,g_2)^{-r_x}T_2^{r_f}T_3^{r_b}T_4^{r_a}$, $R_5=dpk_j^{r_x}$.

Calculate $c=H(gpk|B|J|K|T|R_1|R_2|R_3|R_4|R_5|m)$.

Calculate $s_f=r_f+c\, f_i$, $s_x=r_x+c\, x_i$, $s_a=r_a+c\, a$, $s_b=r_b+c\, b$.

The member Mi then has the signature of the message: $\sigma=(B, J, K, T, c, s_f, s_x, s_a, s_b)$ and a pseudonym $nym_{ij}=dpk_j^{x_i}$ then enabling him to identify himself in the group. The signature $\sigma$ and the element $R_5$ may be used to verify the membership of the member in the group independently of the pseudonym, and thus anonymously. Moreover, the signature and the pseudonym may be used to prove that the member identified by the pseudonym $nym_{ij}$ is the signatory of the message m. Alternatively, the signature and the pseudonym may be used to prove in a single verification operation the membership of the member in the group and that the member identified by the pseudonym $nym_{ij}$ is the signatory of the message m, as detailed below.

The pseudonym of the member $M_i$ in the domain $D_j$ being formed from the domain parameter $dpk_j$ specific to the domain Dj, the member $M_i$ will have different pseudonyms in separate domains. It is then impossible for the service providers 204 or verifiers 205 to determine whether two messages in two separate domains having different signatures and pseudonyms have been signed by the same member ("cross-domain unlinkability").

Nevertheless, to maintain the property of unlinkability, the service providers and verifiers must not have knowledge of $r_j$. In fact, from $r_j$ and a pseudonym $nym_{ij}=dpk_j^{x_i}$ with $dpk_j=g_1^{r_j} \cdot g_1^{x_i}$ may be recovered. Thus by knowing two $r_j$ used to generate the domain parameters of two separate domains, a service provider or a verifier could determine if two pseudonyms in these domains correspond to the same member.

The signature $\sigma$ is designed such that the member Mi can prove, by signing a message or challenge, that he has knowledge of the secret signature key $ski=(f_i, x_i, A_i)$ without disclosing same, advantageously by a zero knowledge proof algorithm, and thus prove his membership in the group.

Furthermore, by construction, xi, which constitutes a second portion of secret signature key, is used both for the calculation of the signature of the message m and to generate the pseudonym used by the member $M_i$. This makes it possible to link them and thus to prove from the signature and the pseudonym that the member $M_i$ knows the second portion of key $x_i$ without revealing the latter and that the member identified by the pseudonym constructed from said second portion of key xi is indeed the legitimate signatory of the message m.

In order to limit the use of the resources of the user device of the member $M_i$, the management authority 203 can send, during the execution of the step of adherence to the group E200, the result of the coupling $e(A_i,g_2)$ to the member $M_i$ in order that said member does not have to take charge of the calculation of this coupling during the calculation of $R_3$. In fact, $e(T_2, g_2)=e(A_i,g_2)\, e(\widehat{g_1},g_2)^a$. Knowing $e(A_i,g_2)$ and $e(\widehat{g_1},g_2)$ the member $M_i$ thus has only exponentiations and multiplications to calculate.

Similarly, advantageously, all the calculations performed during this signature step may be carried out off-line before the reception of the message m to be signed, with the exception of the hash calculation and exponentiations of $R_5$ and $nym_{ij}$. This makes it possible to limit the signature time of a message and the resources necessary thereto. According to a variant, it is also possible to calculate in advance, $R_5$ and $nym_{ij}$ for each of the service providers if the domain parameters $dpk_j$ have been acquired beforehand by the member $M_i$ and if the memory necessary to store the results of these calculations is available.

At the end of this signature step, the user device 201 of the member Mi transmits during a step E303 via its communication interface means the signature a obtained, the pseudonym corresponding to the member $M_i$, and the element $R_5$ in the second embodiment, to the control server 205s that has sent him the challenge to sign, or instead to the addressee of the message m to which it also sends the message m.

Figure 7:
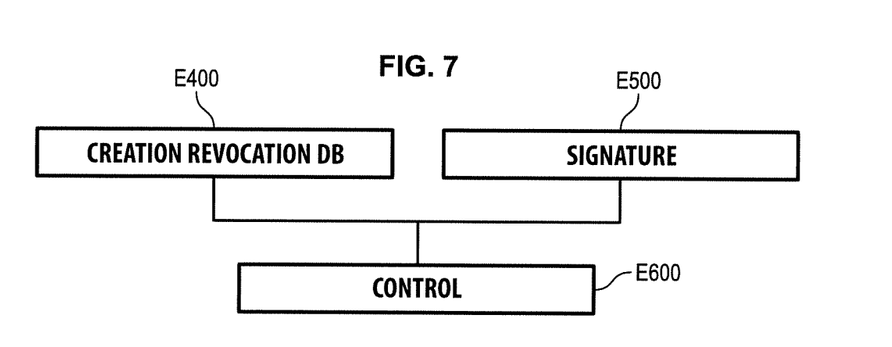
FIG. 7 represents a flow chart illustrating the generic steps of a method for signing and a method for signature controlling according to an embodiment of the invention.

The invention also relates to a method for signing and for signature controlling, an embodiment of which is described in FIG. 7 and which may include steps of creation of a revocation database E400, a step E500 of implementing the signature method illustrated in FIG. 3 and a step E600 of signature control, the steps E400 and E600 being described below.

For members able to adhere to the group or leave it at different instants or instead members able to lose their signature capacity, a revocation mechanism may be put in place during step E400. A revocation list may be established for each domain and updated by the management authority 203. To achieve this, a revocation list $RL_j$ for the domain Dj is designed from pseudonyms $nym_{ij}$ of revoked members of the group and stored in a revocation database $BD_j$. According to an embodiment of the invention, when the management authority wishes to revoke a member $M_i$ of the group, the management server 203s transmits to each server 204s of the service provider $SP_j$, the second portion of secret key $x_i$ of the member, and each server of the service provider $SP_j$ calculates the corresponding pseudonyms $nym_{ij}$ and adds them to the revocation list $RL_j$ of the revocation database $BD_j$.

Figure 8:
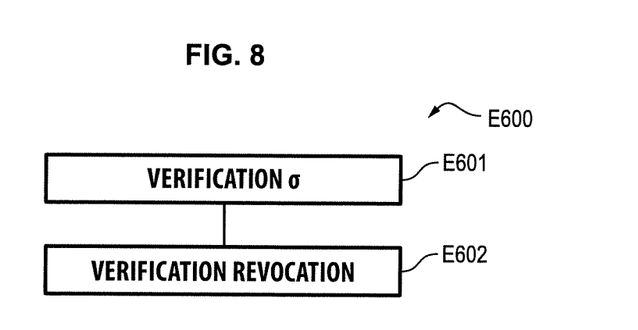
FIG. 8 represents a flow chart illustrating the steps of a method for signature controlling according to an embodiment of the invention.

As illustrated in FIG. 8, the method for signature controlling E600 includes a first step E601 of verification consisting in controlling, from the signature σ and the pseudonym $nym_{ij}$, that the member Mi has knowledge of the secret signature key $ski=(f_i, x_i, A_i)$, that is to say that he is a legitimate member of the group, and that the pseudonym and the signature of the member Mi are linked, that is to say that said pseudonym and said signature of the member Mi are a function of a portion of said secret signature key. If this verification is positive, the pseudonym received with the signature is indeed that of the signatory.

According to an embodiment, said step of verification comprises a step of verification of proof during which the processing means of the control server verify that a zero knowledge proof proving that the member identified by the pseudonym is the signatory of the message (m) is correct.

Advantageously, said step of verification of proof verifies the equality of discrete logarithms of the value $K=B^{x_i}$ in base B and of the pseudonym $nym_{ij}=dpk_j^{x_i}$ in base $dpk_j$.

The membership of the signatory in the group is verifiable independently of the pseudonym and the verification that the proof that the member identified by the pseudonym is the signatory of the message is correct is performed by separate operations from the signature and the pseudonym.

According to a variant of the second embodiment, said step of verification may comprise an operation of verification of said signature making it possible to prove both the membership of the member (Mi) in the group and that the member identified by the pseudonym is the signatory of the message.

The control method E600 may also comprise a second step E602 of verification of revocation consisting in verifying that the member Mi has not been revoked from the group.

More specifically, in the first embodiment of the invention, during step E601, the processing means of a control server 205s:

Verify that B, J, K, T belong to $G_1$ and that $s_f, s_x, s_a, s_b, s_{x2}$ belong to $Z_p$.

Calculate $R'_2=B^{s_x}K^{-c}$, $R'_3=e(T,g_2)^{-s_x}T_2^{s_f}T_3^{s_b}T_4^{s_a}T_1^{c}e(T,w)^{-c}$, $R'_4=K^{s_a}B^{-s_b}$, $R'_1=B^{s_f}J^{-c}$, $R'_5=dpk_j^{s_{x2}}nym_{ij}^{-d}$ and $R'_6=B^{s_{x2}}K^{-d}$.

Verify that $c=H(gpk| |B| |J| |K| |T| |R'_1| |R'_2| |R'_3| |R'_4| |m)$ and that $d=H(gpk| |B| |K| |dpk_j| |nym_{ij}| |R'_5| |R'_6)$.

In this embodiment the verification of the equality between c and $H(gpk| |B| |J| |K| |T| |R'_1| |R'_2| |R'_3| |R'_4| |m)$ makes it possible to prove the membership of the member in the group independently of the pseudonym. Moreover, the verification of the equality between d and $H(gpk| |B| |K| |dpk_j| |nym_{ij}| |R'_5| |R'_6)$ makes it possible to prove that the same secret key has been used to generate the pseudonym and the signature.

In the second embodiment of the invention, during step E601, the processing means of a control server 205s:

Verify that B, J, K, T belong to $G_1$ and that $s_f, s_x, s_a, s_b$ belong to $Z_p$.

Calculate $R'_2=B^{s_x}K^{-c}$, $R'_3=e(T,g_2)^{-s_x}T_2^{s_f}T_3^{s_b}T_4^{s_a}T_1^{c}e(T,w)^{-c}$ and $R'_4=K^{s_a}B^{-s_b}$, $R'_1=B^{s_f}J^{-c}$ Verify that $c=H(gpk| |B| |J| |K| |T| |R'_1| |R|_2| |R'_3| |R'_4| |R_5| |m)$.

In this embodiment the verification of the equality between c and $H(gpk| |B| |J| |K| |T| |R'_1| |R'_2| |R'_3| |R'_4| |R'_5| |m)$ makes it possible to prove the membership of the member in the group anonymously independently of the pseudonym.

From the pseudonym, the processing means of a control server 205s then calculate $R'_5=dpk_j^{s_x}nym_{ij}^{-c}$ and verify that $c=H(gpk| |B| |J| |K| |T| |R'_1| |R'_2| |R'_3| |R'_4| |R'_5| |m)$. This verification makes it possible to prove that the same secret key has been used to generate the pseudonym and the signature, and thus that the member identified by the pseudonym is indeed the signatory of the message.

According to a variant of this second embodiment of the invention, during step E601, the processing means of a control server 205s:

Verify that B, J, K, T belong to G1 and that $s_f, s_x, s_a, s_b$ belong to $Z_p$.

Calculate $R'_2=B^{s_x}K^{-c}$, $R'_3=e(T,g_2)^{-s_x}T_2^{s_f}T_3^{s_b}T_4^{s_a}T_1^{c}e(T,w)^{-c}$, $R'_4=K^{s_a}B^{-s_b}$, $R'_1=B^{s_f}J^{-c}$ and $R'_5=dpk_j^{s_x}nym_{ij}^{-c}$ Verify that $c=H(gpk| |B| |J| |K| |T| |R'_1| |R'_2| |R'_3| |R'_4| |R'_5| |m)$.

In this variant, the verification of the equality between c and $H(gpk| |B| |J| |K| |T| |R'_1| |R'_2| |R'_3| |R'_4| |R'_5| |m)$ makes it possible both to prove the membership of the member in the group and to prove that the same secret key has been used to generate the pseudonym and the signature.

Thus, in all of the embodiments described, a verifier can control the membership of the signatory of the message in the group without knowing the group secret and identify the signatory by the pseudonym thereof. The verifier can also control that the pseudonym supplied with the signature indeed identifies the signatory.

In an embodiment of the invention, during step E602 the processing means of the control server verify in the revocation database $BD_j$ that the pseudonym $nym_{ij}$ does not belong to the revocation list $RL_j$.

If the two steps of verifications E601 and E602 are positive, then the signature and the pseudonym are considered as valid.

To verify the signature of a message m and the pseudonym of the member $M_i$, the control server only needs to know this signature and this pseudonym as well as the domain parameters $dpk_j$ and the public parameters gpk. The control server has particularly no knowledge of the secret signature key of the member $M_i$. No control server can accordingly sign a message on behalf of the member, or know the pseudonym of the member $M_i$ in several domains and link the signatures and pseudonyms of said member for different domains. Accordingly, and by virtue of the construction of the pseudonyms: when two pseudonyms are observed for two different domains, it is impossible, thanks to hypotheses of complexity of certain mathematical problems, to say if they correspond or not to the same member.

On the other hand, the revocation list is not taken into account during the signature. This makes it possible not to have to renew the keys of valid members after a revocation of a member and does not imply additional calculations for the signatory.

Furthermore, during the second verification step, the processing means of the control server only have one test of adherence to a list to carry out and not a linear number of arithmetic operations as in known group signature mechanisms.

According to a variant of the invention, lists of valid members are used instead of revocation lists. During the second verification step, the control server must then verify that the pseudonym that it verifies indeed belongs to the list of valid members.

Advantageously the databases for storing these lists are stored on the servers of the service providers. According to a variant, the lists are memorised in a shared database stored on the key management server.

Thus, the subject matter of the invention makes it possible to construct signatures using pseudonyms and enabling a member of a group to sign a message in the name of the group, while having an identity in the group, without having the drawbacks of signature mechanisms using pseudonyms.

In fact this signature mechanism is secure even in the case of recovery and gathering of signature keys by members of the group and can also guarantee that no-one, including the key management authority, can sign a message on behalf of a member of the group.

The signature mechanism which is the subject matter of the invention may be applied to carry out for example anonymous biometric authentications as described in the reference Bringer, J. Chabanne, H. Pointcheval, D. Zimmer, S. *An application of the Boneh and Shacham group signature scheme to biometric authentication*. In: Matsuura, K., Fujisaki, E. (eds.) *IWSEC. Lecture Notes in Computer Science, vol.* 5312, pp. 219-230. Springer (2008) and may be based on group signatures of "Backward Unlinkability" type as described in the reference Bringer, J., Patey, A. *VLR group signatures—how to achieve both backward unlinkability and efficient revocation checks*. In: *SECRYPT*. pp. 215-220 (2012) and in the reference Nakanishi, T., Funabiki, N.: *A short verifier-local revocation group signature scheme with backward unlinkability*. In: Yoshiura, H., Sakurai, K., Rannenberg, K., Murayama, Y., Ichi Kawamura, S. (eds.) *IWSEC. Lecture Notes in Computer Science, vol.* 4266, pp. 17-32. Springer (2006).

The invention claimed is:

1. A method for signing a message (m) implemented by processing means of a user device of a member ($M_i$) who belongs to a group of members (G), said user device having a secret signature key (ski),
   including a step of generating (E301) a group signature (σ) for the message (m), said group signature enabling said member ($M_i$) to prove his membership in the group of members (G), and a step of generating (E302) a pseudonym ($nym_{ij}$) uniquely identifying the member ($M_i$) within a domain ($D_j$) of a service provider ($SP_j$) said domain including a set of terminals in communication with a server of said service provider,
   said group signature (σ) comprising the secret signature key (ski) in an encrypted form, for allowing the member (Mi) to sign the message (m) with said group signature (σ) without disclosing the secret signature key (ski) to a recipient of the message (m),
   wherein said group signature (σ) is sufficient for allowing the membership of the member ($M_i$) in the group to be verified, independently from the pseudonym ($nym_{ij}$),
   said pseudonym ($nym_{ij}$) and an element (K) of said group signature are both a function of a portion (xi) of said secret signature key of the member ($M_i$), so that a zero knowledge proof algorithm can be performed on said pseudonym ($nym_{ij}$) and said element (K) in order to prove that the member identified by the pseudonym is the signatory of the message (m)
   and said pseudonym ($nym_{ij}$) of the member ($M_i$) is specific to the domain ($D_j$).

2. The method according to claim 1, wherein the secret signature key (ski) is known uniquely to the member ($M_i$) having said user device.

3. The method according to claim 1, wherein said secret signature key (ski) is stored in a secure storage means.

4. The method according to claim 1, said method including, prior to said steps of generating a group signature and a pseudonym, a step (E100) of generating keys implemented by a key management server of a key management authority, during which, processing means of the management server:
   generate for the group of members (G) a set of public parameters (gpk) (E101),
   determine a domain parameter ($dpk_j$) specific to the domain ($D_j$) (E102) and,
   transmit said parameter to the service provider ($SP_j$) (E103).

5. The method according to claim 4 wherein the domain parameter ($dpk_j$) is equal to $g_1 r_j$, with $r_j$ an integer and g1 a generator of a group G1, g1 being a parameter among the set of public parameters (gpk).

6. The method according to claim 5 wherein the integer $r_j$ is determined by the key management authority.

7. The method according to claim 4,
   wherein said pseudonym ($nym_{ij}$) of the member ($M_i$) in the domain ($D_j$) is a function of the domain parameter ($dpk_j$) specific to the domain ($D_j$) determined by said management server.

8. The method according to claim 4, wherein the pseudonym ($nym_{ij}$) is equal to $dpk_j x_i$ with xi said portion of secret signature key of the member ($M_i$) and $dpk_j$ said domain parameter.

9. The method according to claim 1, wherein said signature (σ) comprises a value K, different to the pseudonym ($nym_{ij}$), of the form B^xi with B an element of a group G1 and xi said portion of secret signature key of the member ($M_i$).

10. A method for controlling a signature of a message (m) and a pseudonym, the method being implemented by processing means of a control server, said signature (σ) and said pseudonym (nymij) being generated (E500) according to the method of claim 1, said method including a step of verification (E601), from the signature (σ) and the pseudonym (nymij), that the signatory of the message (m) knows the secret signature key (ski), and that said pseudonym and said signature of the member (Mi) are both a function of a portion (xi) of said secret signature key, so as to prove that the member identified by the pseudonym is the signatory of the message (m) and that said member belongs to the group of members (G).

11. The method according to claim 10, wherein said step of verification includes a step of verification of proof during which processing means of the control server verify that a zero knowledge proof proving that the member identified by the pseudonym is the signatory of the message (m) is correct.

12. The methodMethod for controlling according to claim 11, wherein said step of verification of proof verifies the equality of discrete logarithms of the value K in base B and the pseudonym $nym_{ij}$ in base $dpk_j$.

13. The method according to claim 11, wherein said step of verification includes a verification of said signature to prove the membership of the member (Mi) in the group and in that said step of verification of proof is carried out during the verification of said signature.

14. The method according to claim 10, including a step (E602) of verification of the revocation of the member (Mi) from the group of members (G).

15. The method according to claim 14, wherein processing means of the control server verify in a database that the pseudonym ($nym_{ij}$) of the member (Mi) does not belong to a revocation list ($RL_j$) for the domain ($D_j$), said revocation list being designed (E400) from pseudonyms ($nym_{ij}$) of the members of the group of members (G) revoked by the management authority.

16. The method according to claim 15, wherein said management authority, wishing to revoke a member (Mi) from the group of members (G), transmits said portion of secret key ($x_i$) of the member ($M_i$) to the service provider ($SP_j$) and in that said revocation list ($RL_j$) for the domain ($D_j$) stored in a database is designed by the service provider ($SP_j$) by adding, to the revocation list ($RL_j$), the pseudonym ($nym_{ij}$) of the member (Mi) calculated from said portion of secret key received.

17. A computer-readable storage device containing code instructions which, when said code instructions are executed on a computer,
   generate (E301) a group signature (σ) for a message (m), enabling a member (Mi) of a group of members (G), having a secret signature key (ski), to prove that said member (Mi) is a member of said group, said group signature (σ) comprising the secret signature key (ski) in an encrypted form, allowing the member (Mi) to sign the message (m) with said group signature (σ) without disclosing the secret signature key (ski) to a recipient of the message (m),
   generate (E302) a pseudonym (nymij) identifying the member (Mi) within a domain (Dj) of a service provider (SPj), said domain including a set of terminals in communication with a server of said service provider, said pseudonym (nymij) of the member (Mi) being specific to the domain (Dj),
   wherein the group signature (σ) is sufficient to allow the membership of the member ($M_i$) in the group to be verified, independently from the pseudonym ($nym_{ij}$),
   and said pseudonym and an element of said signature are both a function of a portion (xi) of said secret signature key of the member (Mi), so that a zero knowledge proof algorithm is performed on said pseudonym (nymij) and said element (K) in order to prove that the member identified by the pseudonym is the signatory of the message (m).

18. A system comprising a user device (201) including at least storage means, processing means and a communication interface, a key management server (203s), and a service provider server (205s) of a service provider for a service domain (Dj), wherein the user device (201), the key management server (203s) and the service provider server (205s) are configured to:
   generate (E301) a group signature (σ) for a message (m), enabling a member (Mi) of a group of members (G), having a secret signature key (ski), to prove that said member (Mi) is a member of said group, said group signature (σ) comprising the secret signature key (ski) in an encrypted form, allowing the user device (201) of the member (Mi) to sign the message (m) with said group signature (σ) without disclosing the secret signature key (ski) to a recipient of the message (m),
   generate (E302) a pseudonym (nymij) identifying the member (Mi) within the service provider server (205s), said pseudonym (nymij) of the member (Mi) being specific to the the service domain (Dj),
   wherein the group signature (σ) is sufficient to allow the membership of the member ($M_i$) in the group to be verified, independently from the pseudonym ($nym_{ij}$),
   and said pseudonym (nymij) and said element (K) of the signature are both a function of a portion (xi) of said secret signature key of the member (Mi), so that a zero knowledge proof algorithm is performed on said pseudonym (nymij) and said element (B) in order to prove that the member identified by the pseudonym is the signatory of the message (m).

19. A system comprising:
   a user device including at least storage means, processing means and a communication interface; and
   a control server including at least storage means, processing means and, a communication interface,
   wherein said control server is configured to implement a method according to claim 10.

* * * * *